(12) United States Patent
Doll

(10) Patent No.: US 6,250,612 B1
(45) Date of Patent: Jun. 26, 2001

(54) RAM WITH ELECTRONICS ENCLOSURE COMPARTMENT

(75) Inventor: Robert A. Doll, Glendale, WI (US)

(73) Assignee: Actuant Corporation, Milwaukee, WI (US)

(*) Notice: Subject to any disclaimer, the term of this patent is extended or adjusted under 35 U.S.C. 154(b) by 0 days.

(21) Appl. No.: 09/261,065

(22) Filed: Mar. 2, 1999

Related U.S. Application Data

(63) Continuation of application No. PCT/US98/21236, filed on Oct. 8, 1998.
(60) Provisional application No. 60/061,773, filed on Oct. 10, 1997.

(51) Int. Cl.$^7$ .......................................................... F16F 5/00
(52) U.S. Cl. ............................ 267/64.11; 188/284; 92/5 R
(58) Field of Search ................................. 188/322.21, 315, 188/316, 299.1, 322.75, 284, 322.19; 267/64.11, 64.16, 64.24, 64.28; 92/5 R, 34

(56) References Cited

U.S. PATENT DOCUMENTS

| | | | |
|---|---|---|---|
| 3,559,776 | 2/1971 | Schultze | 188/299 |
| 4,054,295 | 10/1977 | Elliott | 280/6.1 |
| 4,552,055 | * 11/1985 | Foxwell | 92/5 R |
| 4,936,143 | * 6/1990 | Schutten et al. | 92/5 R |
| 5,014,829 | 5/1991 | Hare, Sr. | 188/267 |
| 5,320,325 | * 6/1994 | Young et al. | 92/5 R |
| 5,467,852 | 11/1995 | de Kock | 188/322.14 |

\* cited by examiner

*Primary Examiner*—Robert J. Oberleitner
*Assistant Examiner*—Robert A. Siconolfi
(74) *Attorney, Agent, or Firm*—Quarles & Brady LLP

(57) ABSTRACT

A ram (10) with a hydraulic cylinder (22) and piston (52) has an electronics enclosure compartment (54) integrated within it at one end. The compartment (54) is formed by two clam shells (70, 72) which are bolted to the end of the cylinder (22) so as to create a chamber for housing the electronics (66). The outer clam shell (72) has an axially aligned ram mounting attachment (74) integrally formed on it, and the inner clam shell (70) has an axial opening to which is sealed a hollow tube (56) which extends axially within the ram (10) so as to enclose a sensor (60) which is associated with the electronics (66) in the compartment (54).

7 Claims, 2 Drawing Sheets

RAM WITH ELECTRONICS ENCLOSURE COMPARTMENT

CROSS-REFERENCE TO RELATED APPLICATION

This is a continuation of International Application No. PCT/US98/21236 filed Oct. 8, 1998 designating the United States, which claims the benefit of the filing date of U.S. Provisional Patent Application No. 60/061,773 filed Oct. 10, 1997.

BACKGROUND OF THE INVENTION

1. Field of the Invention

This invention relates to a ram cylinder and piston construction which includes an electronics enclosure compartment.

2. Discussion of the Prior Art

Hydro-pneumatic vehicle suspension systems are well known. Typically, one or more single or double acting hydraulic rams are provided at each wheel to support the vehicle, with hydraulic circuits interconnecting the rams. A gas-charged accumulator is typically used to pressurize the hydraulic circuits and therefore, provide resilient displacement of the rams and consequently springing of the vehicle.

One hydro-pneumatic vehicle suspension system has come to be known as the "X" type. In such a system, the rams of diagonally opposite wheels of a vehicle are connected with discrete hydraulic circuits, each circuit connecting the bore side of one of the rams with the rod side of the diagonally opposite ram. Such an X-system is known, for example, from patents such as French Patent No. 1,535,641 and U.S. Pat. Nos. 4,270,771; 5,447,332; 5,562,305; 5,601,306; and 5,601,307.

Central to the design are the rams which support the vehicle body on the wheels and react to the hydraulic system. Another important aspect of the design are hydraulic accumulators which essentially act as springs to pressurize the rams so as to desirably support the body over the wheels.

Each ram may mount an accumulator assembly, which poses special problems not normally associated with shock absorbers, struts or common hydraulic cylinders. The wheel suspension rams must not only mount the accumulator assembly, but must also do so in a small and certain space or "envelope", being closely adjacent to the body, the wheel, and other suspension components, while permitting electrical and hydraulic connections to be made to the cylinder/accumulator assembly. Each ram must fit within the permitted envelope and be lightweight and strong, since it is pressurized to an extent to bear the weight of the vehicle and dynamic loading.

In addition, each ram may also include electronics, for example for an internal linear displacement transducer, to provide an input of the displacement of the cylinder to an onboard computer so that the controller has that information to determine adjustments that should be made to the system to deliver the desired ride characteristics. The present invention relates to such a ram, which has an electronics enclosure integrated into it.

SUMMARY OF THE INVENTION

The invention provides a fluid power ram in which the electronic components of the ram are contained within a chamber of a compartment which is positioned at an end of the ram. The compartment is intersected by the longitudinal axis of the ram and includes a ram mounting attachment outside of the chamber for mounting the end of the ram. Thereby, electronics of the ram are protected within a structurally sound, clean and dry compartment within the ram, without increasing the radial envelope required by the ram, and in a manner which facilitates service access to the ram.

In a preferred form, the compartment includes first and second clam shells with a parting line between them which is generally perpendicular to the longitudinal axis of the cylinder. In this form, the first and second clam shells are preferably bolted together with bolts that have their axes parallel to the longitudinal axis of the ram. The bolts may also usefully fix the first and second clam shells to the end of the cylinder. The ram mounting attachment can be formed as part of an outer one of the clam shells. In this manner, service access to the ram is provided by unbolting the clam shells.

In another useful aspect of the invention, an opening is formed in the inner one of the clam shells, the opening being axially aligned with the longitudinal axis of the ram. A pressure tube is sealed to the opening and the pressure tube extends axially within the ram along the longitudinal axis. A sensor extends within the pressure tube from the compartment. Thereby, the invention can be practiced to house long, axially extending electronic components inside the ram.

These and other objects and advantages of the invention will be apparent from the detailed description and drawings.

DETAILED DESCRIPTION OF THE PREFERRED EMBODIMENTS

Figure 1:
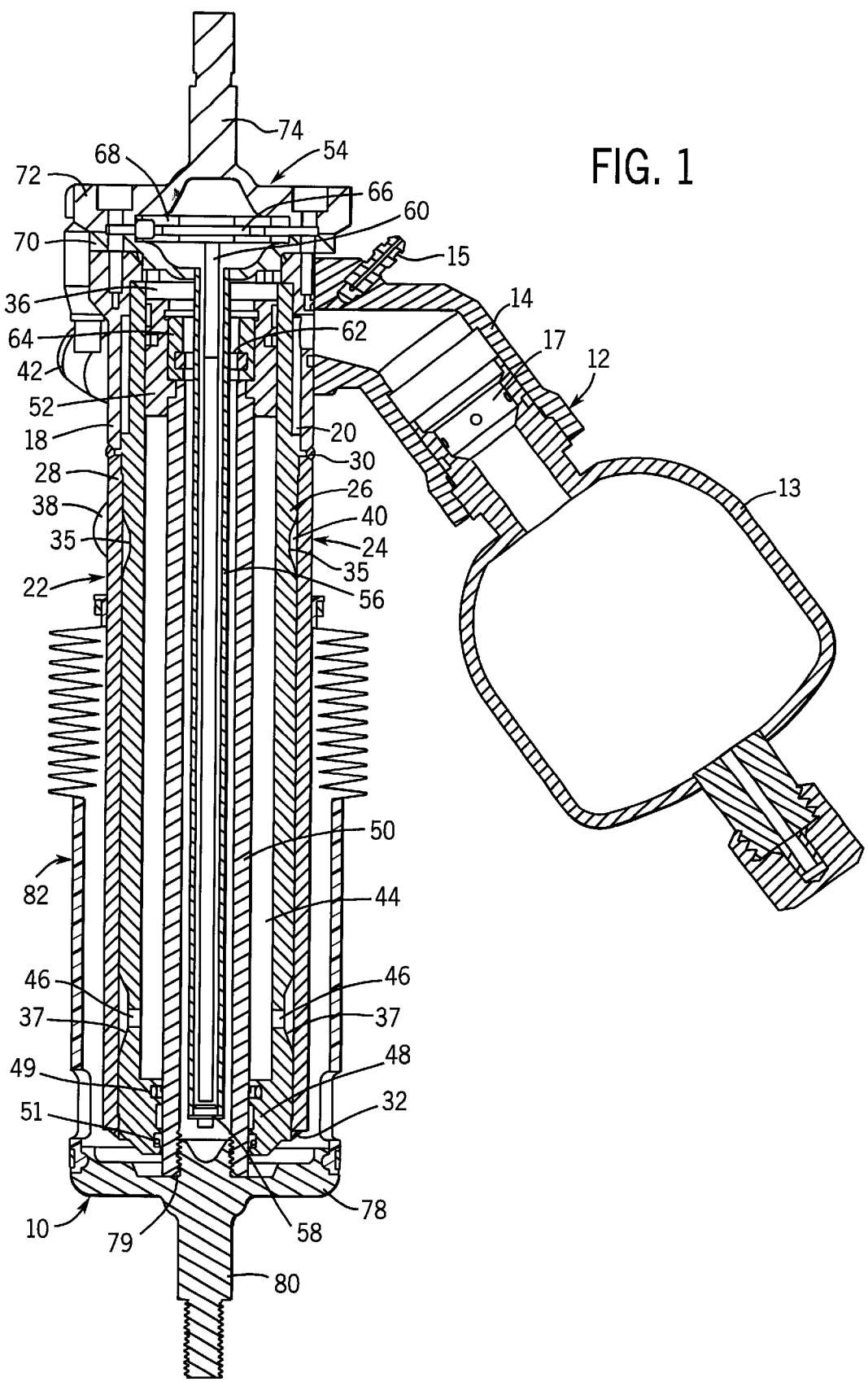
FIG. 1 is a longitudinal cross-sectional view of a ram according to the invention, shown together with a nitrogen charged accumulator assembly.

FIG. 1 illustrates a ram 10 of the invention for incorporation into a vehicle suspension system of the above-described type. The ram 10 is illustrated with an accumulator assembly 12 attached to it, which establishes fluid communication between the ram 10 and a nitrogen charged accumulator 13. The assembly 12 has a goose neck fitting 14 which is sealed and affixed to the upper outer tube 18 by welding or other suitable means. The goose neck 14 provides communication between the upper reservoir 20 inside the tube 18 and the accumulator 13, and has a bleed fitting 15 for bleeding air from the hydraulic circuit.

Preferably, a disc valve pack 17 is provided in the goose neck 14 in the fluid stream between the reservoir 20 and the accumulator 13, so as to damp the resilience provided by the accumulator 13. An on/off or proportional solenoid operated valve may also be provided, for remotely varying the damping of fluid communication with the accumulator 13. However, the invention need not be practiced with any type of accumulator or valve, or any particular hydraulic circuit or suspension system, and no such accumulator, valve circuit or system forms any part of the present invention.

Figure 2:
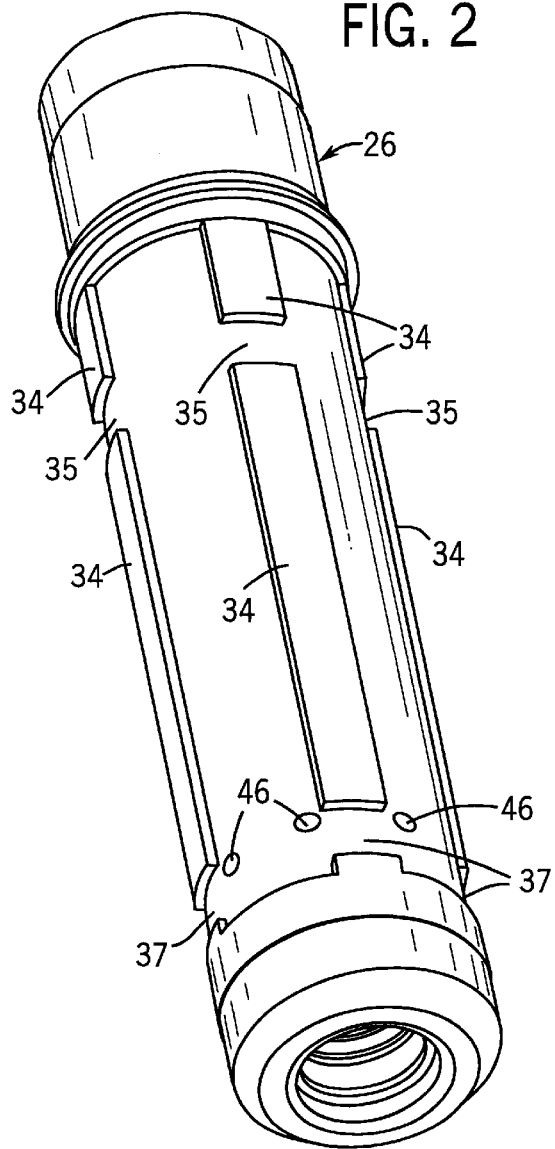
FIG. 2 is a perspective view of an inner tube of the ram of FIG. 1.
Figure 3:
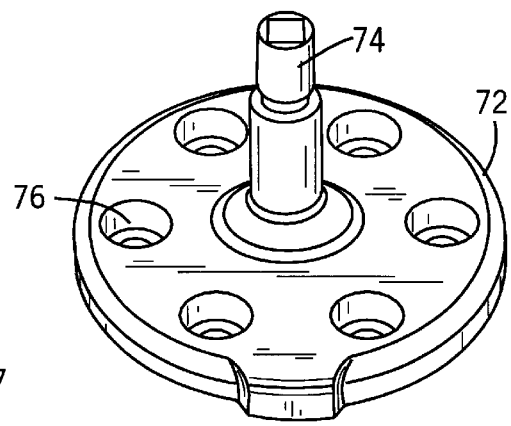
FIG. 3 is a perspective view of an upper clamshell of the ram of FIG. 1.

The ram 10 has a cylinder 22 which includes an outer tube 24 and an inner tube 26. The outer tube 24 includes the upper tube 18, and a lower tube 28. The upper tube 18, lower tube 28, and inner tube 26 are all welded together by seam weld 30. In addition, the lower end of outer tube 24 is welded to the inner tube 26 by seam weld 32 at the gland end of the cylinder. The upper and lower tubes 18 and 28 are generally tubular. The inner tube 26, on the other hand, has an outer surface which is contoured with circumferentially spaced, axially running ribs 34, best shown in FIG. 2. The ribs 34 define between them passageways for fluid flow between the inner tube 26 and the outer tube 24, while permitting free flow from one passageway to another, by providing a break at 35 and at 37 in each rib. A lower port 38 is provided for supplying and exhausting fluid from the lower reservoir 40, which is defined between the lower tube 28 and the inner tube 26. An upper port 42 is provided for supplying and exhausting fluid from the upper reservoir 20. Thus, port 38 provides communication with reservoir 40 and port 42 provides communication with reservoir 20. It is noted that reservoir 20 is in communication with the bore side or upper chamber 36 (passageways not shown) and that the reservoir 40 is in communication with rod side or lower chamber 44, via holes 46 which are formed in the inner tube 26.

Chamber 44 is the volume which is at the lower, gland end 48, below piston 52, which is bordered on the outside by inner tube 26 and is bordered on its inner diameter by piston rod 50. Piston 52 is secured to the top of rod 50 and establishes a sliding seal with the inner tube 26. Bore side chamber 36 is capped off by clam shell compartment 54 and includes the volume above piston 52 and extends down inside the piston rod 50. The inner diameter of chamber 36 is defined by pressure tube 56. Pressure tube 56 is sealed at its lower end by a pressure tube cap 58 and at its upper end is joined and sealed, such as by welding, to the clam shell compartment 54. A position sensor 60 extends down inside the pressure tube 56, which keeps the sensor 60 dry, and a magnet 62 is affixed inside the piston 52 by a magnet carrier sleeve 64 so that the sensor 60 can sense the axial position of the magnet 62. Sensor 60 may be any type of linear displacement transducer, although in the embodiment disclosed it is a magneto-strictive type of sensor.

Figure 4:
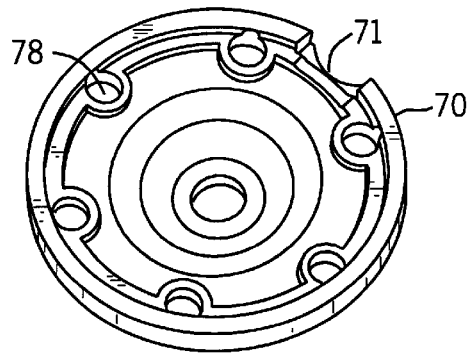
FIG. 4 is a perspective view of a lower clamshell of the ram of FIG. 1.

The sensor 60 is supported inside the pressure tube 56 by a printed circuit board 66 which itself is encased in a protective housing 68. The circuit board 66 and housing 68 are captured between a lower or inner clam shell 70 and an upper or outer clam shell 72, which make up the clam shell compartment 54. The shells 70, 72 define a side opening 71 (FIG. 4) at the parting line between them to permit wires (not shown) to enter the compartment created by the shells, to make electrical connections to the electronic circuitry contained therein. The lower clam shell 70 is sealed to the upper outer tube 18 and the upper clam shell 72 has upper mounting stud 74 extending from it, for connection to the vehicle chassis. The stud 74 is one type of ram mounting attachment, it being possible to practice the invention with other types of ram mounting attachments, another common type being a ball joint, for example. The upper clam shell 72 has spaced holes 76 and the lower clam shell 70 has spaced holes 78 in registration with the holes 76 so that the clam shell assembly 54 can be bolted to the upper end of the upper outer tube 18. The printed circuit board 66 may also have a similar pattern of holes for securing it in the compartment 54 using the bolts (not shown).

As mentioned above, the gland 48 is formed by the lower end of the inner tube 26. Gland 48 has formed in it an axial generally cylindrical hole through which the piston rod 50 extends and in which annular grooves are formed for containing sliding seals 49 and 51 so as to establish a fluid-tight sliding seal with the piston rod 50. At the lower end of piston rod 50, compression disc 78 is screwed into the piston rod 50 with a fluid-tight seal 79 between the disc 78 and the rod 50. Mounting stud 80 extends from the disc 78 for mounting the lower end of the cylinder 10 to a wheel support wishbone, or other wheel support suspension structure. A bellows 82 has its lower end attached to the disc 78 and its upper end attached around the outer tube 24 so as to help keep the piston rod 50 clean.

The chamber 44 extends upwardly from the gland 48 for a distance before encountering the holes 46 which establish communication between the chamber 44 and the reservoir 40. Thus, when the piston 52 reaches the lower limit of its stroke, its bottom corner first passes the holes 46 so as to trap a volume of hydraulic fluid between its bottom end and the gland 48, which provides a hydraulic cushion. However, since the piston seals are provided higher up on the piston 52, there must be a very close fit between the piston 52 and the lower end of the chamber 44. Thus, the lower end of the chamber 44 is slightly smaller in diameter than the chamber 44 above the holes 46, as can be seen in FIG. 1. Because of the extremely accurate concentricity required to establish a small enough clearance between the piston 52 and the bore at the lower end of the chamber 44 to provide a hydraulic cushion, the gland 48 and the inner tube 26 which defines the bore of chamber 44 are made in one piece.

Also as mentioned above, the inner tube 26 has the raised ribs 34 which define between them axial and circumferential flow passages. The raised ribs 34 also serve to reinforce the inner tube 26 because of the increased thickness of material in the area of the ribs 34. However, in addition, the outer surfaces of the ribs 34 are in close proximity to the inner surface of outer tube 24 as shown in FIG. 1. Thus, as inner tube 26 flexes outwardly, the ribs 34 contact the outer tube 24 and outer tube 24 helps restrain the inner tube 26 from flexing further outwardly. Thus, there is structural sharing between the inner tube 26 and the outer tube 24 of the loads which are placed on the inner tube 26.

Thus, at least three aspects of the cylinder 10 are believed to be unique. One is providing the clam shell compartment 54 for housing the electronics associated with the sensor 60. Another is providing for structural sharing between the inner tube 26 and the outer tube 24, more specifically by providing the ribs 34, and the third is forming the gland 48 and the inner tube 26 in a single piece.

Many modifications and variations to the preferred embodiment described will be apparent to those skilled in the art, which will still incorporate aspects of the invention. Therefore, the invention should not be limited to the embodiment described but should be defined by the claims which follow.

I claim:

1. A fluid power ram having a cylinder with a bore that defines a longitudinal axis of said ram, a piston axially slidable in said bore and electronic components contained within said ram, the improvement wherein said electronic components are contained within a chamber of a compartment which is positioned at an end of said ram, said compartment being intersected by said longitudinal axis of said ram and including a ram mounting attachment outside of said chamber for mounting said end of said ram, wherein said compartment includes fist and second clam shells with a parting line between them, said parting line being generally perpendicular to said longitudinal axis of said cylinder and wherein one of said clam shells includes said ram mounting attachment, wherein an opening is formed in the other of said clam shells, said opening being axially aligned with said longitudinal axis of said ram, and a pressure tube is sealed to said opening and extends axially within a piston rod of said ram along said longitudinal axis of said ram.

2. The improvement of claim 1, wherein said ram mounting attachment is aligned with said longitudinal axis of said ram.

3. The improvement of claim 1, wherein said chamber is intersected by said longitudinal axis of said ram.

4. The improvement of claim 1, wherein said first and second clam shells are bolted together with bolts that have their axes parallel to said longitudinal axis of said ram.

5. The improvement of claim 4, wherein said bolts fix said first and second clam shells to said cylinder.

6. The improvement of claim 1, wherein a sensor extends within said pressure tube from said compartment.

7. The improvement of claim 1, wherein said clam shell compartment forms a seal with said cylinder.

* * * * *